United States Patent
Landau et al.

(10) Patent No.: US 11,546,241 B2
(45) Date of Patent: *Jan. 3, 2023

(54) TECHNOLOGIES FOR TIMESTAMPING WITH ERROR CORRECTION

(71) Applicant: Intel Corporation, Santa Clara, CA (US)

(72) Inventors: Yoni Landau, Or-Aqiva (IL); Janardhan H. Satyanarayana, Allentown, PA (US); Assaf Benhamou, Haifa (IL); Mark A. Bordogna, Andover, MA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/503,817

(22) Filed: Oct. 18, 2021

(65) Prior Publication Data
US 2022/0150149 A1    May 12, 2022

Related U.S. Application Data

(63) Continuation of application No. 15/941,854, filed on Mar. 30, 2018, now Pat. No. 11,153,191.
(Continued)

(51) Int. Cl.
*H04L 12/26* (2006.01)
*H04L 43/106* (2022.01)
(Continued)

(52) U.S. Cl.
CPC .......... *H04L 43/106* (2013.01); *H04L 1/0041* (2013.01); *H04L 1/0045* (2013.01);
(Continued)

(58) Field of Classification Search
CPC ... H04L 43/106; H04L 1/0041; H04L 1/0045; H04L 1/0058; H04L 69/22; H04L 1/0057
See application file for complete search history.

(56) References Cited

U.S. PATENT DOCUMENTS 8,761,209 B1 * 6/2014 Brown .................. H04L 12/413
370/535
9,197,531 B1   11/2015 Mendel et al.
(Continued)

FOREIGN PATENT DOCUMENTS

WO    2018186876 A1    10/2018

OTHER PUBLICATIONS

First Office Action for U.S. Appl. No. 17/134,115, dated Apr. 8, 2022, 20 pages.
(Continued)

*Primary Examiner* — Wutchung Chu
(74) *Attorney, Agent, or Firm* — Essential Patents Group, LLP.; Christopher K. Gagne

(57) ABSTRACT

Technologies for timestamping data packets with forward error correction is disclosed. Alignment markers may be inserted in a data stream in order to assist with synchronization on the receiving end. After insertion of the alignment markers, a start of frame delimiter or other trigger may be detected, triggering a timestamp corresponding to the start of frame delimiter or other trigger. The data and the timestamp are sent to a remote compute device, which may timestamp the data before removing the alignment markers. With this approach, insertion of the alignment markers does not lead to a deviation in the timestamp of the sending compute device or the receiving compute device.

19 Claims, 6 Drawing Sheets

Related U.S. Application Data

(60) Provisional application No. 62/619,689, filed on Jan. 19, 2018.

(51) Int. Cl.
*H04L 69/22* (2022.01)
*H04L 1/00* (2006.01)

(52) U.S. Cl.
CPC ............ *H04L 1/0058* (2013.01); *H04L 69/22* (2013.01); *H04L 1/0057* (2013.01)

(56) References Cited

U.S. PATENT DOCUMENTS

| | | | | |
|---|---|---|---|---|
| 9,203,770 | B2* | 12/2015 | Soffer | H04L 47/34 |
| 9,235,540 | B1* | 1/2016 | Langhammer | G06F 13/36 |
| 10,069,660 | B1* | 9/2018 | Sun | H04L 25/03146 |
| 11,265,096 | B2 | 3/2022 | Bordogna et al. | |
| 2004/0062278 | A1 | 4/2004 | Hadzic et al. | |
| 2008/0019398 | A1 | 1/2008 | Genossar et al. | |
| 2008/0144624 | A1 | 6/2008 | Marcondes et al. | |
| 2010/0172647 | A1* | 7/2010 | Luo | H04J 3/0605 |
| | | | | 398/66 |
| 2011/0188565 | A1* | 8/2011 | Lawson | H03K 5/19 |
| | | | | 375/233 |
| 2012/0221882 | A1 | 8/2012 | Morrison et al. | |
| 2013/0170525 | A1* | 7/2013 | Asaad | G06F 30/331 |
| | | | | 375/219 |
| 2014/0092918 | A1* | 4/2014 | Jost | H04J 3/0661 |
| | | | | 370/465 |
| 2014/0269769 | A1 | 9/2014 | Gresham et al. | |
| 2015/0055644 | A1* | 2/2015 | Bordogna | H04J 3/0697 |
| | | | | 370/350 |
| 2015/0103850 | A1* | 4/2015 | Wang | H04B 10/00 |
| | | | | 370/538 |
| 2015/0106668 | A1* | 4/2015 | Ran | H04L 1/203 |
| | | | | 714/704 |
| 2016/0134392 | A1* | 5/2016 | Effenberger | H04L 1/0057 |
| | | | | 714/776 |
| 2016/0241462 | A1* | 8/2016 | Wang | H04L 45/245 |
| 2016/0337114 | A1* | 11/2016 | Baden | H04J 3/0697 |
| 2016/0352500 | A1* | 12/2016 | Benjamini | H04L 7/0012 |
| 2017/0041126 | A1 | 2/2017 | Bergeron | |
| 2017/0070339 | A1* | 3/2017 | Kaneta | H04N 21/23602 |
| 2017/0093757 | A1* | 3/2017 | Gareau | H04J 3/065 |
| 2017/0331592 | A1* | 11/2017 | Matsushita | H04L 1/0091 |
| 2018/0041332 | A1* | 2/2018 | Yang | H04L 7/048 |
| 2018/0191802 | A1* | 7/2018 | Yang | H04L 1/0018 |
| 2019/0044650 | A1* | 2/2019 | Khan | H04L 7/00 |
| 2019/0044839 | A1 | 2/2019 | Landau et al. | |
| 2019/0097748 | A1* | 3/2019 | Loprieno | H04L 1/0041 |
| 2019/0132185 | A1* | 5/2019 | Farhoodfar | H04L 12/427 |
| 2019/0273571 | A1 | 9/2019 | Bordogna et al. | |
| 2020/0021313 | A1* | 1/2020 | Lu | H04L 1/0065 |
| 2020/0259578 | A1* | 8/2020 | He | H04L 7/00 |
| 2020/0328767 | A1* | 10/2020 | Zhong | H04J 3/1658 |

OTHER PUBLICATIONS

25G & 50G Specification, 25 and 50G Ethernet Consortium, dated Jun. 14, 2016.

Aliaga, Ramon J., et al., "PET System Synchronization and Timing Resolution Using High-Speed Data Links," 2011, IEEE Transactions on Nuclear Science, vol. 58, Issue 4, pp. 1596-1605.

Extended European Search Report for Patent Application No. 20165323.5, dated Oct. 9, 2020, 11 pages.

First Office Action for U.S. Appl. No. 16/410,275, dated Mar. 18, 2021, 18 pages.

IEEE 802.3-2018, "IEEE Standard for Ethernet", Aug. 31, 2018, (Year: 2018).

IEEE P802.3cd™/D3.1, Draft Standard for Ethernet, "Amendment 3: Media Access Control Parameters for 50 GB/s and Physical Layers and Management Parameters for 50 GB/s, 100 GB/s, and 200 GB/s Operation", Sponsor LAN/MAN Standards Committee of the IEEE Computer Society, Feb. 7, 2018, The Institute of Electrical and Electronics Engineers, Inc., New York, USA, 409 pages.

IEEE Standard for Ethernet, "Corrigendum 1: Multi-lane Timestamping", IEEE Std 802.3™-2015/Cor 1-2017, Sponsor LAN/MAN Standards Committee of the IEEE Computer Society, IEEE-SA Standards Board, New York, USA, Mar. 23, 2017, 16 pages.

IEEE Standard for Ethernet, Section Four, Downloaded on Jan. 18, 2018 at 17:17:06 UTC from IEEE Xplore., 2282 pages.

IEEE Std 802.3-2015, approved Sep. 3, 2015, by the IEEE-SA Standards Board.

IEEE Std 802.3by-2016, approved Jun. 30, 2016, by the IEEE-SA Standards Board.

International Telecommunication Union, Telecommunication Standardization Sector, Study Period 2013-2016, COM 15—LS 226—E, San Jose, Mar. 2-6, 2015, 4 pages.

International Telecommunication Union, Telecommunication Standardization Sector, Study Period 2017-2020, SG15-LS72 Study Group 15, Auckland, Oct. 9-13, 2017, 3 pages.

Liaison to IEEE802.1 concerning the impact on timing performance due to Ethernet PHY, Liaison statement, International Telecommunication Union, 3 pages.

Notice of Allowance for U.S. Appl. No. 16/410,275, dated Nov. 3, 2021, 5 pages.

Notice of Allowance for U.S. Appl. No. 16/410,275, dated Oct. 6, 2020, 8 pages.

Office Action for U.S. Appl. No. 15/941,854, dated Mar. 2, 2021, 17 pages.

PCT Search Report and Written Opinion prepared for PCT/US2017/026504, completed Oct. 25, 2017.

* cited by examiner

TECHNOLOGIES FOR TIMESTAMPING WITH ERROR CORRECTION

CROSS-REFERENCE TO RELATED APPLICATION

This application is a continuation of U.S. patent application Ser. No. 15/941,854, filed Mar. 30, 2018. U.S. patent application Ser. No. 15/941,854 claims priority under 35 U.S.C. § 119(e) to U.S. Provisional Patent Application Ser. No. 62/619,689, filed Jan. 19, 2018. The entire specifications of which are hereby incorporated herein by reference in their entirety.

BACKGROUND

Timestamping packets that are sent or received over a network is important for several applications. Determination of a time of sending and arrival of a packet may be used to synchronize a time of day counter between the sending and receiving compute devices, which may be necessary for time-sensitive applications such as certain wireless communication protocols.

A timestamp of when a packet is sent or received may have several sources of inaccuracy. For example, a packet may be scrambled, requiring descrambling before a pattern can be recognized for timestamping, or the packet may be transferred between domains with asynchronous clocks as compared to the clock used for timestamping, both of which may contribute to the inaccuracy in timestamping when a packet actually arrives at a device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
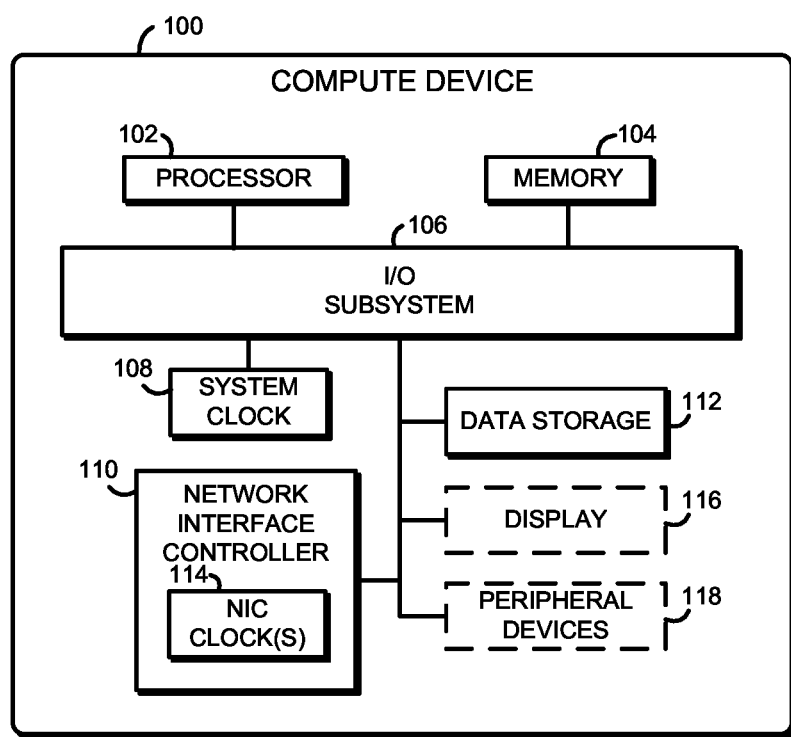
FIG. 1 is a simplified block diagram of at least one embodiment of a compute device for timestamping data packets.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 is configured to perform timestamping of data packets that are either sent or received by a network interface controller 110 of the compute device 100. In use, when data is received by the network interface controller 110 from another component of the compute device 100, the network interface controller 110 performs several steps as part of processing the data before sending it over the network. For example, in an illustrative embodiment, the data is received on a 32-bit bus using an elastic store phase first in, first out (FIFO) coder. The phase FIFO coder may periodically insert alignment markers and may delete other data such as idle control characters. It should be appreciated that the insertion of alignment markers and/or deletion of other data such as idle control characters may impact the timing of when the data is sent over the network and could lead to a timestamp with lower precision. After the phase FIFO, the data on the 32-bit bus is transferred to a 64-bit bus. Then, each block of 64 bits is encoded and scrambled to 66 bits. As part of encoding the 64 bits into 66 bits, the network interface controller 110 monitors for a trigger pattern, such as a start of frame delimiter of an Ethernet packet, and triggers a timestamp when the start of frame delimiter is detected. It should be appreciated that, since the timestamp is done after the alignment markers are inserted and/or other data such as idle control characters are deleted, the timestamp will not be impacted due to that insertion or deletion. Subsequently, a set of four blocks of 66 bits each (264 bits total) is transcoded to a block of 257 bits. Several blocks of 257 bits are then encoded with a forward error correction algorithm, such as Reed-Solomon. The encoded blocks are then sent out to the network, such as on an electrical cable or optical cable.

The compute device 100 may be embodied as any type of compute device capable of managing data packets and performing the functions described herein. For example, the compute device 100 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. The illustrative compute device 100 includes the processor 102, a memory 104, an input/output (I/O) subsystem 106, a system clock 108, a network interface controller 110, and data storage 112. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The system clock 108 may be embodied as any type of device, circuit, and/or collection of devices or circuits capable of generating a clock signal usable by other components of the compute device 100. For example, the system clock 108 may be embodied as, or otherwise include, a crystal oscillator-based circuit. The clock signal may be used by various components of the compute device 100 to synchronize timing of communication. For example, the processor 102 and the memory 104 may each be synchronized to the system clock 108. The clock signal may be any type of clock signal, such as a square wave or a sine wave. The frequency of the clock signal generated by the system clock 108 may be any suitable frequency, such as 100, 200, or 500 megahertz (MHz).

The network interface controller 110 may be embodied as any type of interface capable of interfacing the compute device 100 with other compute devices, such as over a network. In some embodiments, the network interface controller 110 may be referred to as a host fabric interface (HFI). The network interface controller 110 may be capable of interfacing with any appropriate cable type, such as an electrical cable or an optical cable, and/or may be capable of interfacing with a wireless signal, such as through one or more antennae. The network interface controller 110 may be configured to use any one or more communication technology and associated protocols (e.g., Ethernet, Bluetooth®, Wi-Fi®, WiMAX, near field communication (NFC), etc.). The network interface controller 110 may be located on silicon separate from the processor 102, or the network interface controller 110 may be included in a multi-chip package with the processor 102, or even on the same die as the processor 102. The network interface controller 110 may be embodied as one or more add-in-boards, daughtercards, network interface cards, controller chips, chipsets, specialized components such as a field programmable gate array (FPGA) or application specific integrated circuit (ASIC), or other devices that may be used by the compute device 100 to connect with another compute device. In some embodiments, network interface controller 110 may be embodied as part of a system-on-a-chip (SoC) that includes one or more processors, or included on a multichip package that also contains one or more processors. In some embodiments, the network interface controller 110 may include a local processor (not shown) and/or a local memory (not shown) that are both local to the network interface controller 110. In such embodiments, the local processor of the network interface controller 110 may be capable of performing one or more of the functions of the processor 102 described herein. Additionally or alternatively, in such embodiments, the local memory of the network interface controller 110 may be integrated into one or more components of the compute device 100 at the board level, socket level, chip level, and/or other levels.

The illustrative network interface controller 110 includes one or more network interface controller clocks (NIC clocks) 114. In the illustrative embodiment, one of the NIC clocks 114 is used for transmitting a signal to another compute device. The NIC clock 114 used for transmission may be similar to the system clock 108, the description of which will not be repeated in the interest of clarity. In the illustrative embodiment, another one of the NIC clocks 114 is used for receiving a signal from another compute device. The NIC clock 114 used for receiving may operate in a different manner from the system clock 108, such as by recovering a clock from the signal received by the network interface controller 110. It should be appreciated that the NIC clocks 114 may operate at a different frequency than the system clock 108, and the NIC clocks 114 and the system clock 108 may be free-running (i.e., operate independently of each other with no fixed timing relationship between them). It should further be appreciated that different components of the network interface controller 110 may operate on different clocks, including the NIC clock(s) 114 and the system clock 108.

The data storage 112 may be embodied as any type of device or devices configured for the short-term or long-term storage of data. For example, the data storage 112 may include any one or more memory devices and circuits, memory cards, hard disk drives, solid-state drives, or other data storage devices.

In some embodiments, the compute device 100 may include other or additional components, such as those commonly found in a compute device. For example, the compute device 100 may also have a display 116 and/or peripheral devices 118. The peripheral devices 118 may include a keyboard, a mouse, etc. The display 116 may be embodied as any type of display on which information may be displayed to a user of the compute device 100, such as a touchscreen display, a liquid crystal display (LCD), a light emitting diode (LED) display, a cathode ray tube (CRT) display, a plasma display, an image projector (e.g., 2D or 3D), a laser projector, a heads-up display, and/or other display technology.

Figure 2:
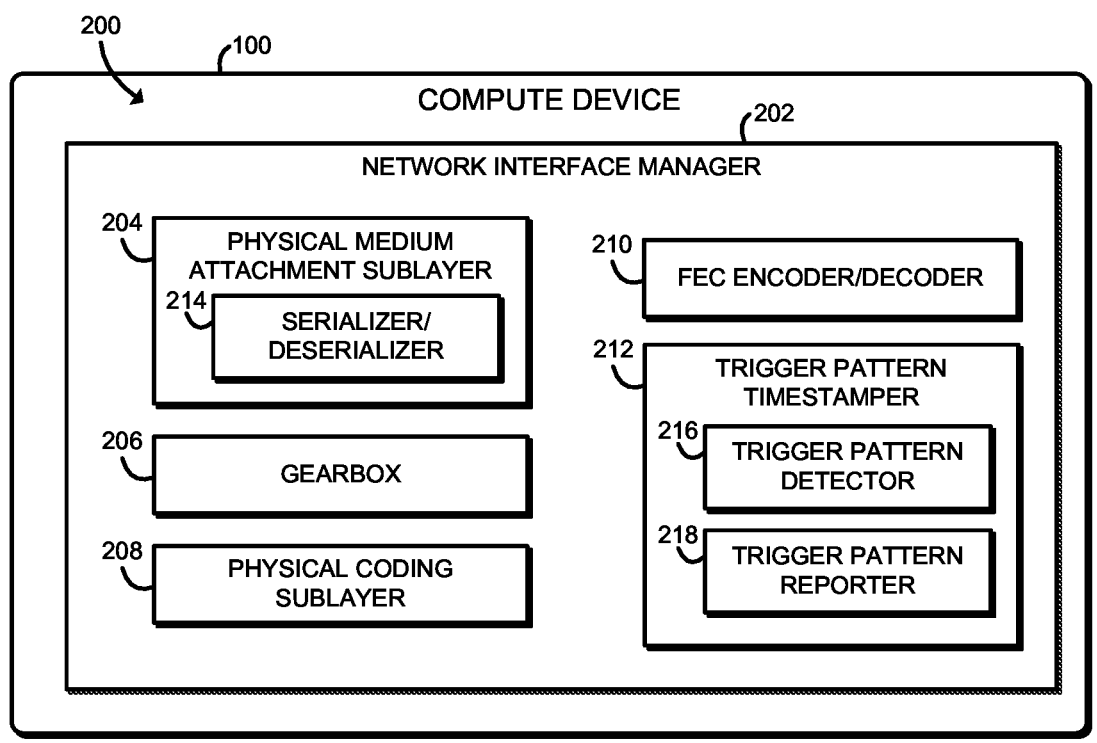
FIG. 2 is a block diagram of at least one embodiment of an environment that may be established by the compute device of FIG. 1.

Referring now to FIG. 2, in an illustrative embodiment, the compute device 100 establishes an environment 200 during operation. The illustrative environment 200 includes a network interface manager 202. The various modules of the environment 200 may be embodied as hardware, software, firmware, or a combination thereof. For example, the various modules, logic, and other components of the environment 200 may form a portion of, or otherwise be established by, the processor 102 or other hardware components of the compute device 100 such as the network interface controller 110. As such, in some embodiments, one or more of the modules of the environment 200 may be embodied as circuitry or collection of electrical devices (e.g., a network interface manager circuit 202, etc.). It should be appreciated that, in such embodiments, one or more of the circuits (e.g., the network interface manager circuit 202, etc.) may form a portion of one or more of the processor 102, the memory 104, the I/O subsystem 106, the network interface controller 110, the data storage 112, and/or other components of the compute device 100. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 100. It should be appreciated that some of the functionality of one or more of the modules of the environment 200 may require a hardware implementation, in which case embodiments of modules which implement such functionality will be embodied at least partially as hardware.

The network interface manager 202, which may be embodied as hardware, firmware, software, virtualized hardware, emulated architecture, and/or a combination thereof as discussed above, is configured to control the network interface controller 110, including the interaction of the network interface controller 110 with the physical medium to which it is attached and the processing of incoming and outgoing signals which the network interface controller 110 receives and sends. The network interface manager 202 includes a physical medium attachment sublayer 204, one or more gearboxes 206, a physical coding sublayer 208, a forward error correction (FEC) encoder/decoder 210, and a data packet timestamper 212.

The physical medium attachment sublayer 204 is configured to sample an incoming signal at the physical medium to which it is attached and provide a signal usable for other components of the network interface controller 110, such as a serial electrical signal at standardized voltage levels. The physical medium attachment sublayer 204 may operate at any suitable rate or bandwidth, such 10 gigabits per second (Gbps), 25 Gbps, 40 Gbps, 100 Gbps, or higher or lower than those rates. The physical medium attachment sublayer 204 is also configured to send outgoing signals received from other components of the network interface controller 110 to the physical medium to which it is attached. In the illustrative embodiment, the physical medium attachment sublayer 204 synchronizes a NIC clock 114 to the incoming signal, which is used by the physical medium attachment sublayer 204 and other components of the network interface controller 110 for processing the incoming signal. The illustrative physical medium attachment sublayer 204 also uses a NIC clock 114 that is free-running relative to other clocks for sending a signal over the physical medium and for processing the signal before it is sent over the physical medium.

The illustrative physical medium attachment includes a serializer/deserializer (SerDes) 214. The SerDes 214 is configured to transfer a serial signal to a parallel signal and to transfer a parallel signal to a serial signal. In the illustrative embodiment, the physical medium is sampled or driven serially, and the SerDes 214 deserializes incoming signals from the physical medium to a bus for use by the physical medium attachment sublayer 204 and serializes signals from the physical medium attachment sublayer 204 to be sent on the physical medium. The SerDes 212 may transfer between a serial interface and parallel interface of any suitable bus size, such as 16 or 40 bits. In some embodiments, the signal physical medium may not be sent out as a single serial signal, but may be sent out as a parallel signal or as several separate serial signals.

The gearbox 206 is configured to transfer a parallel bus of a first width to/from a parallel bus of a second width. For example, the gearbox 206 may be used to transfer between a parallel bus of 257 bits at the FEC encoder/decoder 210 to/from a parallel bus of 40 bits at the physical medium attachment sublayer 204.

The physical coding sublayer 208 is configured to perform coding on the incoming and outgoing signals. In the illustrative embodiment, the physical coding sublayer 208 performs a 64*b*/66*b* encoding to decode 66 bits to 64 bits or to encode 64 bits to 66 bits using the 64*b*/66*b* encoding algorithm described in IEEE Std 802.3-2015, approved Sep. 3, 2015, by the IEEE-SA Standards Board. To do so, in the illustrative embodiment, the physical coding layer 208 takes 64 bits of outgoing data, adds 2 bits as a synchronization header, and then scrambles the 64 bits. For incoming data, the illustrative physical coding sublayer 208 takes 66 bits of data, removes the first two bits of the synchronization header, and descrambles the remaining two bits. The two bits in the illustrative synchronization header are only valid if they are "01" or "10," and they perform two functions in the illustrative embodiment. First, they act as an indication of the start of 66 bit blocks because there should always be a transition from zero to one or one to zero every 66 bits. Second, they indicate whether the bits in the following 64-bit block are control bits or data bits. In other embodiments, the physical coding sublayer 208 may perform additional or alternative encoding/decoding, such as 4*b*/5*b* encoding/decoding or 8*b*/10*b* encoding/decoding. It should be appreciated that, in the illustrative embodiment, the incoming signal may not be able to be processed until after the physical coding sublayer 208 decodes the signal. For example, the trigger pattern that is being detected as a trigger for timestamping may only be able to be detected after decoding is complete.

The illustrative physical coding sublayer 208 may delete data such as idle control characters from outgoing data. In the illustrative embodiment, idle control characters may be deleted from an interpacket gap period. The physical coding sublayer 208 may periodically insert one or more alignment markers, such as after every 16,383 64-bit blocks or after every 81,916 64-bit blocks. In some embodiments, alignment markers may be inserted in each of several data lanes. For incoming data, with multiple data lanes, the illustrative physical coding sublayer 208 may use the alignment markers to synchronize the data between different lanes. Additionally or alternatively, in some embodiments, the alignment markers may be used as codeword markers. As used herein, an alignment marker refers to a marker that may be used to align multiple data lanes or to a marker that may be used to identify codewords. The illustrative physical coding sublayer 208 removes the alignment markers (regardless of whether there is one lane or more than one lane) and inserts idle control characters in the interpacket gap period. It should be appreciated that the insertion of alignment markers and/or deletion of other data such as idle control characters may impact the timing of when the data is sent over the network and could lead to a timestamp with lower precision if not corrected for. In some embodiments, the physical coding sublayer 208 may receive data with use of an elastic store/phase first-in, first-out buffer. Use of such a buffer may allow the physical coding sublayer 208 to insert alignment markers and delete data such as idle control characters in a way that is less disruptive to the data flow through the components of the NIC 110.

The FEC encoder/decoder 210 is configured to perform forward error correction by encoding an outgoing bitstream and decoding an incoming bitstream. As part of the encoding, the FEC encoder/decoder 210 may transcode four 66 bit blocks of outgoing data to one 257 bit block. In the illustrative embodiment, the FEC encoder/decoder 210 may remove alignment markers, remap them, and insert them into the bitstream as codeword markers without encoding. The remapped alignment markers may have bits shifted or changed as compared to the alignment markers before remapping. In the illustrative embodiment, 4 alignment markers of 66 bits each are remapped to 256 bits plus a 1-bit pad for a total of 257 bits. In the illustrative embodiment, the alignment markers can be used to identify the starting position of codewords in the FEC algorithm, which can be used to decode the encoded data. For that reason, the alignment markers also function as codeword markers. It should be appreciated that, as part of the decoding process, the FEC encoder/decoder 210 may reinsert the alignment markers to the same position as they were removed, which would not cause any variable delay in the timestamping based on detection of a trigger pattern. In the illustrative embodiment, the FEC encode/decoder uses a Reed-Solomon error correcting algorithm with 10-bit symbols by encoding 20 257-bit blocks (i.e., 5,140 bits) with 140 parity bits. The resulting 5,280-bits form a codeword of the FEC algorithm. It should be appreciated that the remapped alignment markers may also serve as codeword markers, indicating the boundaries between codewords. In some embodiments, different approaches to the FEC encoding may be done, such as by using different encoding algorithms, different numbers of blocks, or different numbers of parity bits may be used.

The FEC encoder/decoder 210 is configured to decode incoming data in a similar manner as it encodes outgoing data. The FEC encoder/decoder 210 may lock onto alignment markers (which also act as codeword markers) to mark the boundaries between codewords. Each codeword is decoded, then the alignment markers are removed. The 257-bit blocks are transcoded to 66-bit blocks in a complementary manner to the process described above. Likewise, the alignment markers are remapped to 66-bit blocks in a complementary manner to the process described above. The alignment markers are reinserted to the data in the same location that they were removed.

The trigger pattern timestamper 212 is configured to trigger a timestamp when a trigger pattern is being sent or received. The trigger pattern timestamper 212 includes a trigger pattern detector 216 and a trigger pattern reporter 218. The trigger pattern detector 216 is configured to detect a particular trigger patterns such as the start of a data packet or frame in the incoming or outgoing signal. Upon detection of a trigger pattern by the trigger pattern detector 216, the trigger pattern reporter 218 is configured to report the presence of a particular trigger pattern in the incoming or outgoing data by sending a corresponding trigger to the trigger pattern timestamper 212. The trigger pattern reporter 218 is configured to send the trigger at a fixed time relative to the detection of the relevant trigger pattern so that no variable latency is introduced by the trigger pattern detector 216 or the trigger pattern reporter 218. In the illustrative embodiment, the trigger pattern that the trigger pattern detector 216 and the trigger pattern reporter 218 are configured to trigger on is a start of frame delimiter in an Ethernet frame. In other embodiments, the trigger pattern detector 216 and/or the trigger pattern reporter 218 may be configured to trigger on different trigger patterns, such as a start of a packet or frame from various other protocols, the end of a packet or frame of various protocols, etc. In the illustrative embodiment, the trigger pattern timestamper 212 checks for the presence of a trigger pattern in outgoing data including the alignment markers that will be present in the outgoing data, such as right before the 64b/66b encoding is performed, and checks for the presence of a trigger pattern in incoming data including the received alignment markers, such as right after 64b/66b decoding is performed. In the illustrative embodiment, the alignment markers may be removed, remapped, and reinserted before looking for the presence of a trigger pattern, which is acceptable because the remapping does not introduce a variable latency in the position of the trigger pattern.

Figure 3:
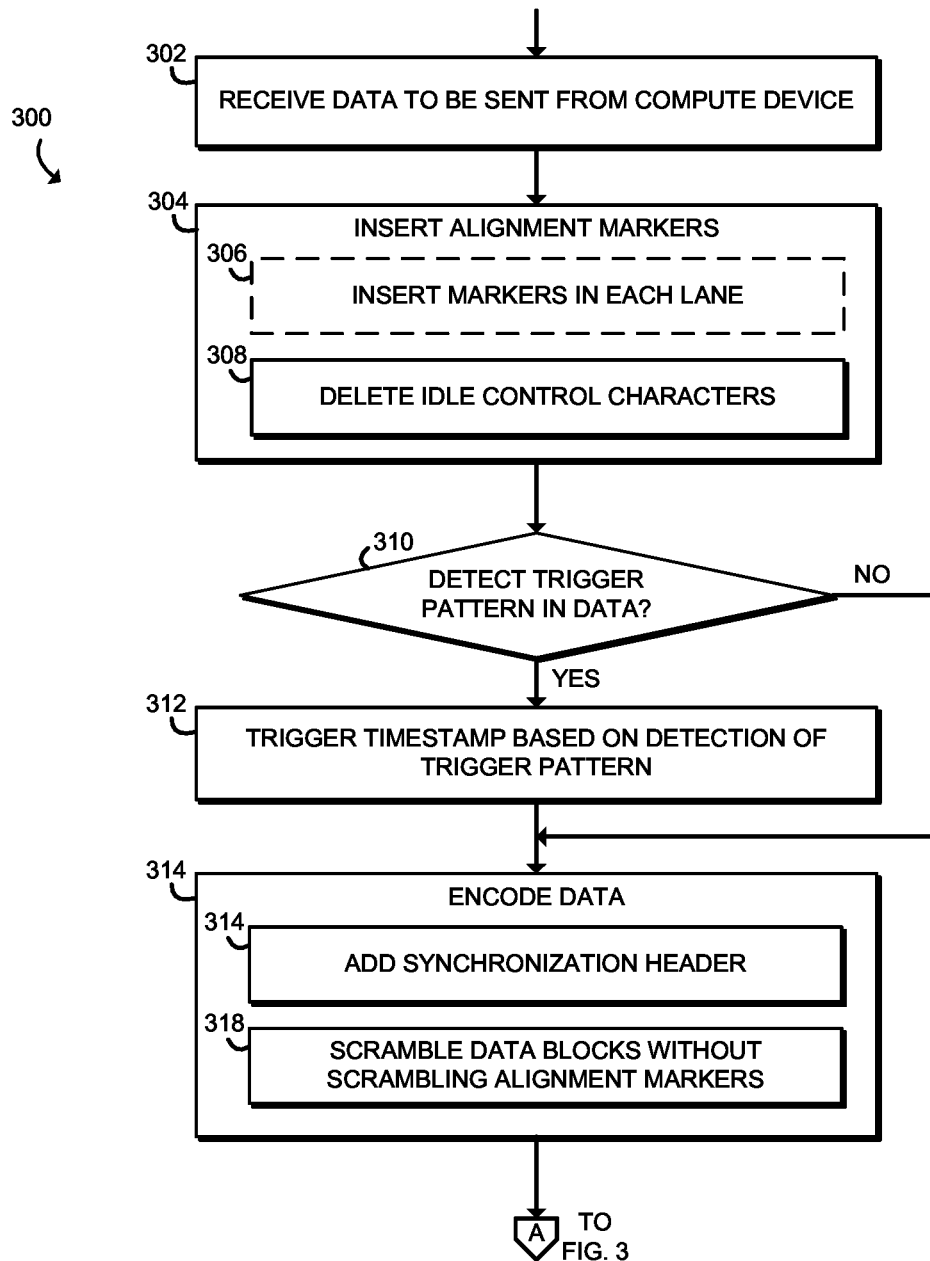
FIGS. 3 & 4 is a simplified flow diagram of at least one embodiment of a method for performing time stamping with error correction for data being sent by a network interface controller of the compute device of FIG. 1.

Referring now to FIG. 3, in use, the compute device 100 may execute a method 300 for performing time stamping with error correction is shown. In block 302, the network interface controller (NIC) 110 receives data from another component of the compute device 100, such as from the processor 102, the memory 104, the I/O subsystem 106, etc.

In block 304, the NIC 110 inserts alignment markers into the data to be sent. In the illustrative embodiment, the alignment markers may be inserted at regular intervals, such as after every 16,383 64-bit block. In some embodiments with multiple lanes, the NIC 110 may insert alignment markers in each of the multiple lanes in block 306. The NIC 110 may also delete other data such as idle control characters from an interpacket gap period in block 308. It should be appreciated that the idle control characters may be deleted to compensate for the insertion of the alignment markers, but the alignment markers do not necessarily appear at the same location as the idle control characters. In some embodiments, the NIC 110 may insert the alignment markers and delete data such as idle control characters as data is passed through an elastic store/phase first-in, first-out buffer. Use of such a buffer may allow the NIC 110 to insert alignment markers and delete data such as idle control characters in a way that is less disruptive to the data flow through the components of the NIC 110.

In block 310, the NIC 110 checks for the presence of a trigger pattern in the data. In the illustrative embodiment, the trigger pattern is a start of frame delimiter in an Ethernet frame. In other embodiments, the trigger pattern may be different, such as a start of a packet or frame from various other protocols, the end of a packet or frame of various protocols, etc. If the NIC 110 detects a trigger pattern, the method 300 proceeds to block 312, in which the NIC 110 triggers a timestamp based on the detection of the trigger pattern. The NIC 110 may record the timestamp corresponding to the trigger pattern found and may use the timestamp to perform various functions, such as a time synchronization with a remote compute device.

Referring back to block 310, if the NIC 110 does not detect a trigger pattern in the data, the method 300 jumps to block 314, in which the NIC 110 encodes the data. In the illustrative embodiment, the NIC 110 encodes the data by encoding 64 bits to 66 bits using the **64*b*/66*b* encoding algorithm described in IEEE Std 802.3-2015, approved Sep. 3, 2015, by the IEEE-SA Standards Board. To do so, in the illustrative embodiment, the NIC 110 adds 2 bits as a synchronization header before the 64-bit block in block 314. The NIC 110 then scrambles the 64 bit-block and prepends the two synchronization bits to the scrambled 64 bits in block 318. It should be appreciated that, in the illustrative embodiment, the NIC 110 does not scramble the alignment markers, although the NIC 110 may still prepend two the synchronization header bits to create a 66-bit alignment marker from a 64-bit alignment marker. The two bits in the illustrative synchronization header are only valid if they are "01" or "10." The synchronization header bits indicate whether the bits in the following 64-bit block are control bits or data bits. In other embodiments, the physical coding sublayer 208 may perform additional or alternative encoding/decoding, such as 4*b*/5*b* encoding/decoding or 8*b*/10*b*** encoding/decoding. It should be appreciated that, in the illustrative embodiment, the outgoing data may not be able to be processed after the data is scrambled. For example, in the illustrative embodiment, the trigger pattern may not able to be detected when scrambled. However, certain other operations may take place before checking for the presence of the trigger pattern, such as adding the 2-bit synchronization header.

Figure 4:
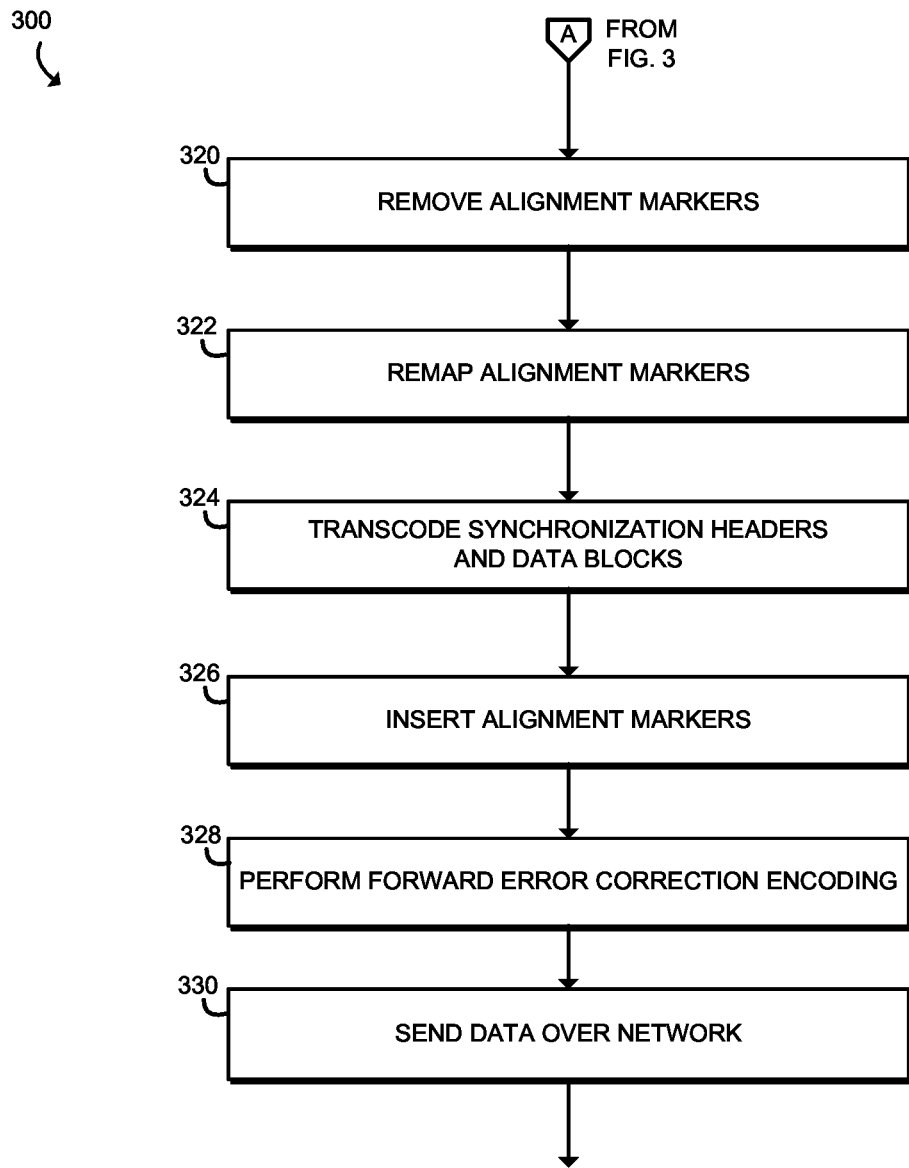

The method 300 proceeds to block 320 in FIG. 4, in which the NIC 110 removes the alignment markers in block 320. The NIC 110 then remaps the alignment markers in block 322. The remapped alignment markers may have bits shifted or changed as compared to the alignment markers before remapping. In the illustrative embodiment, 4 alignment markers of 66 bits each are remapped to 256 bits plus a 1-bit pad for a total of 257 bits.

The NIC 110 then transcodes the 66-bit blocks of synchronization headers and data backs by transcoding 4 66-bit blocks to one 257-bit block in block 324. The NIC 110 then reinserts the remapped alignment markers into the data in block 326. In the illustrative embodiment, the alignment markers can be used to identify the starting position of codewords in the FEC algorithm, which can be used to decode the encoded data. For that reason, the alignment markers also function as codeword markers. It should be appreciated that the NIC 110 may reinsert the alignment markers to the same position as they were removed, which would not cause any variable delay in the timestamping based on detection of a trigger pattern.

In block 328, the NIC 110 performs forward error correction encoding on the data. In the illustrative embodiment, the FEC encode/decoder uses a Reed-Solomon error correcting algorithm with 10-bit symbols by encoding 20 257-bit blocks (i.e., 5,140 bits) with 140 parity bits. The resulting 5,280-bits form a codeword of the FEC algorithm. In some embodiments, different approaches to the FEC encoding may be done, such as by using different encoding algorithms, different numbers of blocks, or different numbers of parity bits may be used.

In block 330, the NIC 110 sends the encoded data over a network. In some embodiments, the NIC 110 may send the encoded data over a physical medium directly to a destination compute device or the data may otherwise not be sent to a network of compute devices.

Figure 5:
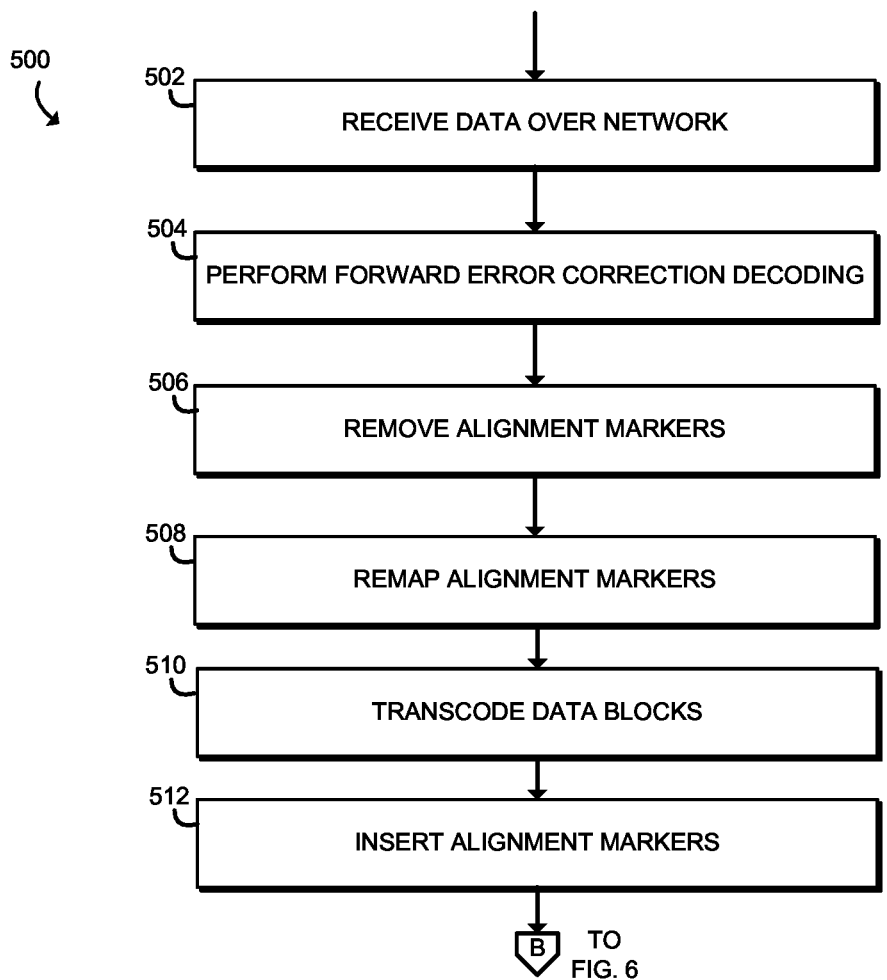
FIGS. 5 & 6 is a simplified flow diagram of at least one embodiment of a method for performing time stamping with error correction for data being received by the network interface controller of the compute device of FIG. 1.

Referring now to FIG. 5, in use, a compute device 100 may execute a method 500 for performing time stamping with error correction is shown. The method 500 is used to timestamp data coming in to the NIC 110 from a network or from another compute device. The method 500 is complementary to the method 300, which is a method used to timestamp data going out from the NIC 110 to a network or to another compute device. Because many of the details are the same between the two methods, some of the detail will be omitted in the description of the method 500 in the interest of clarity.

In block 502, the NIC 110 received data from a network. In some embodiments, the NIC 110 may receive the data over a physical medium directly from a source compute device or the data may otherwise not be received from a network of compute devices.

In block 504, the NIC 110 performs forward error correction decoding. As part of performing error correction decoding, the NIC 110 may lock onto alignment markers (which may function as codeword markers) in order to determine the beginning of codewords to decode. The forward error correction decoding may be complementary to the encoding done in block 328 of the method 300.

In block 506, the NIC 110 removes the alignment markers from the data. In block 508, the NIC 110 remaps the alignment markers. The remapped alignment markers may have bits shifted or changed as compared to the alignment markers before remapping. In the illustrative embodiment, 4 alignment markers in a block of 257 bits are remapped to 4 66-bit alignment markers.

In block 510, the NIC 110 transcodes the decoded data blocks. In the illustrative embodiment, the NIC 110 transcodes a block of 257 bits to four 66-bit blocks. In block 512, the remapped alignment marker is reinserted into the data. It should be appreciated that the NIC 110 may reinsert the alignment markers to the same position as they were removed, which would not cause any variable delay in the timestamping based on detection of a trigger pattern.

Figure 6:
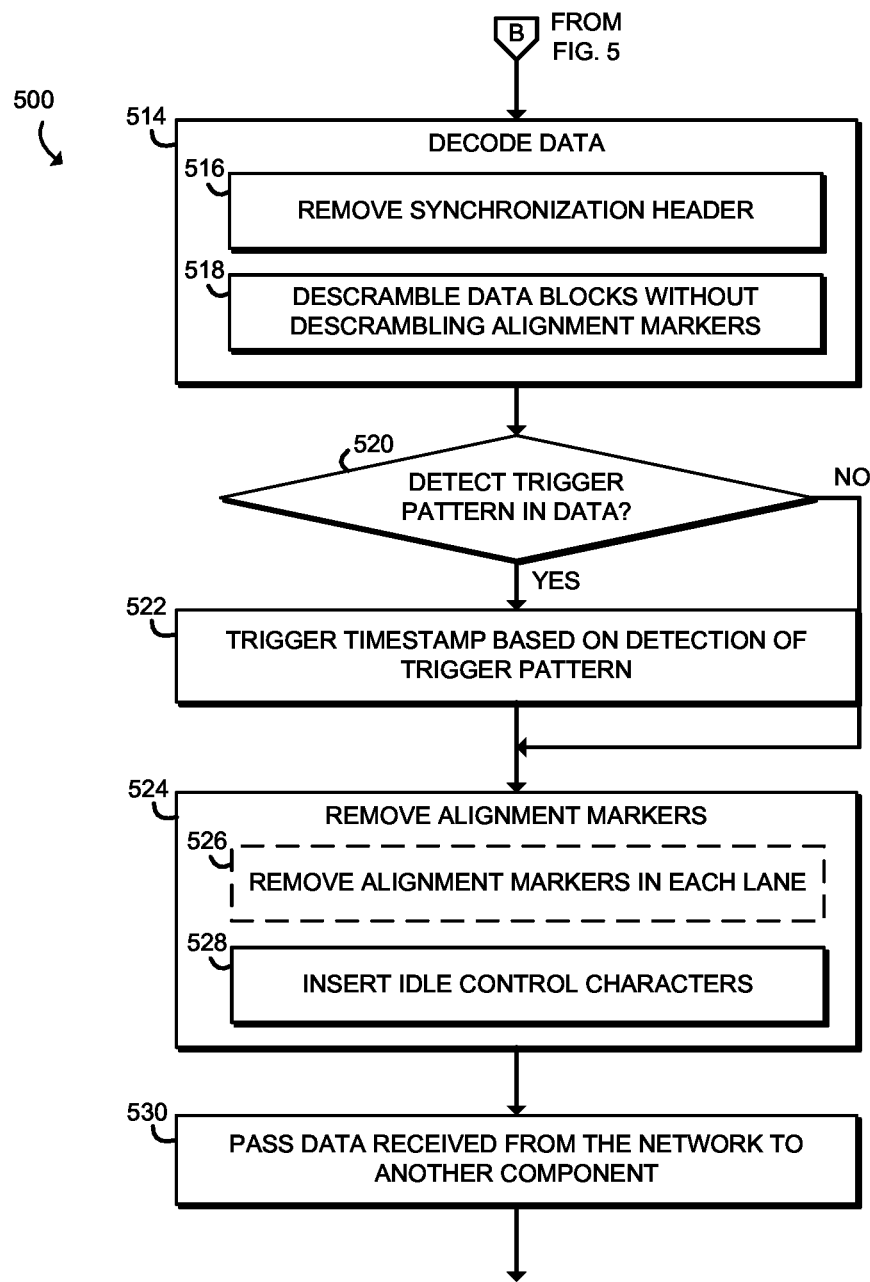

The method 500 proceeds to block 514 in FIG. 6, in which the NIC 110 performs another level of decoding. In the illustrative embodiment, the NIC 110 performs a **66*b*/64*b* decoding. The 66*b*/64*b* decoding may be complementary to the 66*b*/64*b* encoding performed in block 314 of the method 300. The NIC 110 removes a synchronization header from each 66-bit block in block 516. In block 518, the NIC 110** descrambles each 64-bit blocks except the 64-bit blocks corresponding to the alignment markers.

In block 520, the NIC 110 checks for the presence of a trigger pattern in the data. In the illustrative embodiment, the trigger pattern is a start of frame delimiter in an Ethernet frame. In other embodiments, the trigger pattern may be different, such as a start of a packet or frame from various other protocols, the end of a packet or frame of various protocols, etc. If the NIC 110 detects a trigger pattern, the method 500 proceeds to block 522, in which the NIC 110 triggers a timestamp based on the detection of the trigger pattern. The NIC 110 may record the timestamp corresponding to the trigger pattern found and may use the timestamp to perform various functions, such as a time synchronization with a remote compute device.

Referring back to block 520, if the NIC 110 does not detect a trigger pattern in the data, the method 500 jumps to block 524, in which the NIC 110 removes alignment markers from the data. In some embodiments with multiple lanes, the NIC 110 may remove alignment markers in each of the multiple lanes in block 526. The NIC 110 may also insert other data such as idle control characters to an interpacket gap period in block 528. It should be appreciated that the idle control characters may be inserted to compensate for the deletion of the alignment markers, but the alignment markers do not necessarily appear at the same location as the idle control characters. In some embodiments, the NIC 110 may delete the alignment markers and insert other data such as idle control characters as data is passed through an elastic store/phase first-in, first-out buffer. Use of such a buffer may allow the NIC 110 to delete alignment markers and insert other data such as idle control characters in a way that is less disruptive to the data flow through the components of the NIC 110. In block 520, the NIC 110 passes the data to another component of the compute device 100, such as from the processor 102, the memory 104, the I/O subsystem 106, etc.

It should be appreciated that, in some embodiments, the compute device 100 may perform accurate timestamping while also employing error correction in a different manner. For example, in some embodiments, the physical coding sublayer 208 may not insert alignment markers and may not delete idle characters or other data to compensate for the alignment markers. Rather, in such embodiments, the FEC encoder/decoder 210 may insert alignment (or codeword) markers into outgoing data and delete idler characters and/or other data to compensate for insertion of the alignment markers. To do so, the FEC encoder/decoder 210 may decode the outgoing data using a **66*b*/64*b* decoding in order to recognize idle control characters. After this decoding, the FEC encoder/decoder 210 may insert the alignment markers. After the insertion of the alignment markers and before re-encoding the outgoing data with a 66*b*/64*b* encoding, the FEC encoder/decoder 210 may determine whether the outgoing data includes a trigger pattern, such as a start of frame delimiter, in a similar manner as the physical coding sublayer 208 above. The FEC encoder/decoder 210 may then trigger a timestamp based on the detection of the trigger feature. It should be appreciated that detection of the trigger feature in the FEC encoder/decoder 210 after insertion of the alignment markers by the FEC encoder/decoder 210 in such embodiments has the same advantages of avoiding the variable latency from the insertion of the alignment markers as the embodiments described above in regard to FIGS. 3-6. For outgoing data, the FEC encoder/decoder 210 may perform complementary actions to those described above in a similar way that the actions described in FIGS. 5 & 6 are complementary to the actions described in FIGS. 3 & 4**.

EXAMPLES

Illustrative examples of the devices, systems, and methods disclosed herein are provided below. An embodiment of the devices, systems, and methods may include any one or more, and any combination of, the examples described below.

Example 1 includes a compute device for timestamping data packets, the compute device comprising a processor; a memory; and a network interface controller to receive data from another component of the compute device; insert one or more alignment markers in the data; detect a trigger pattern in the data after insertion of the one or more alignment markers; trigger a timestamp corresponding to detection of the trigger pattern; and send the data to a remote compute device.

Example 2 includes the subject matter of Example 1, and wherein the network interface controller is further to remove the one or more alignment markers from the data; remap the one or more alignment markers; encode the data with a forward error correction algorithm; and insert the one or more alignment markers as codeword markers in the data.

Example 3 includes the subject matter of any of Examples 1 and 2, and wherein the trigger pattern is a start of frame delimiter.

Example 4 includes the subject matter of any of Examples 1-3, and wherein the network interface controller is further to add synchronization headers to each of a plurality of 64-bit blocks; and scramble each of the plurality of 64-bit blocks, wherein to detect the trigger pattern in the data comprises to detect the trigger pattern in the plurality of 64-bit blocks after addition of the synchronization headers and before scrambling of the plurality of 64-bit blocks.

Example 5 includes the subject matter of any of Examples 1-4, and wherein the data comprises a plurality of 64-bit blocks, wherein the network interface controller is further to scramble each of the plurality of 64-bit blocks after insertion of the alignment markers without scrambling the alignment markers.

Example 6 includes the subject matter of any of Examples 1-5, and wherein the network interface controller is further to remove a portion of an interpacket gap from the data to compensate for the insertion of the alignment markers.

Example 7 includes the subject matter of any of Examples 1-6, and wherein the network interface controller is further to receive additional data from the remote compute device; detect the trigger pattern in the additional data; trigger a timestamp corresponding to detection of the trigger pattern in the additional data; and remove one or more alignment markers in the additional data after detection of the trigger pattern in the additional data.

Example 8 includes the subject matter of any of Examples 1-7, and wherein to send the data to the remote compute device comprises to send the data to the remote compute device at a rate of at least 25 gigabits per second.

Example 9 includes a method for timestamping data packets by a network interface controller of a compute device, the method comprising receiving, by the network interface controller, data from another component of the compute device; inserting, by the network interface controller, one or more alignment markers in the data; detecting, by the network interface controller, a trigger pattern in the data after insertion of the one or more alignment markers; triggering, by the network interface controller, a timestamp corresponding to detection of the trigger pattern; and sending, by the network interface controller, the data to a remote compute device.

Example 10 includes the subject matter of Example 9, and further including removing, by the network interface controller, the one or more alignment markers from the data; remapping, by the network interface controller, the one or more alignment markers; encoding, by the network interface controller, the data with a forward error correction algorithm; and inserting, by the network interface controller, the one or more alignment markers as codeword markers in the data.

Example 11 includes the subject matter of any of Examples 9 and 10, and wherein the trigger pattern is a start of frame delimiter.

Example 12 includes the subject matter of any of Examples 9-11, and further including adding, by the network interface controller, synchronization headers to each of a plurality of 64-bit blocks; and scrambling, by the network interface controller, each of the plurality of 64-bit blocks, wherein detecting the trigger pattern in the data comprises detecting the trigger pattern in the plurality of 64-bit blocks after addition of the synchronization headers and before scrambling of the plurality of 64-bit blocks.

Example 13 includes the subject matter of any of Examples 9-12, and wherein the data comprises a plurality of 64-bit blocks, further comprising scrambling, by the network interface controller, each of the plurality of 64-bit blocks after insertion of the alignment markers without scrambling the alignment markers.

Example 14 includes the subject matter of any of Examples 9-13, and further including removing, by the network interface controller, a portion of an interpacket gap from the data to compensate for the insertion of the alignment markers.

Example 15 includes the subject matter of any of Examples 9-14, and further including receiving, by the network interface controller, additional data from the remote compute device; detecting, by the network interface controller, the trigger pattern in the additional data; triggering, by the network interface controller, a timestamp corresponding to detection of the trigger pattern in the additional data; and removing, by the network interface controller, one or more alignment markers in the additional data after detection of the trigger pattern in the additional data.

Example 16 includes one or more machine-readable media comprising a plurality of instructions stored thereon that, when executed, causes a compute device to receive data from another component of the compute device; insert one or more alignment markers in the data; detect a trigger pattern in the data after insertion of the one or more alignment markers; trigger a timestamp corresponding to detection of the trigger pattern; and send the data to a remote compute device.

Example 17 includes the subject matter of Example 16, and wherein the plurality of instructions further causes the compute device to remove the one or more alignment markers from the data; remap the one or more alignment markers; encode the data with a forward error correction algorithm; and insert the one or more alignment markers as codeword markers in the data.

Example 18 includes the subject matter of any of Examples 16 and 17, and wherein the trigger pattern is a start of frame delimiter.

Example 19 includes the subject matter of any of Examples 16-18, and wherein the plurality of instructions further causes the compute device to add synchronization headers to each of a plurality of 64-bit blocks; and scramble each of the plurality of 64-bit blocks, wherein to detect the trigger pattern in the data comprises to detect the trigger pattern in the plurality of 64-bit blocks after addition of the synchronization headers and before scrambling of the plurality of 64-bit blocks.

Example 20 includes the subject matter of any of Examples 16-19, and wherein the data comprises a plurality of 64-bit blocks, wherein the plurality of instructions further causes the compute device to scramble each of the plurality of 64-bit blocks after insertion of the alignment markers without scrambling the alignment markers.

Example 21 includes the subject matter of any of Examples 16-20, and wherein the plurality of instructions further causes the compute device to remove a portion of an interpacket gap from the data to compensate for the insertion of the alignment markers.

Example 22 includes the subject matter of any of Examples 16-21, and wherein the plurality of instructions further causes the compute device to receive additional data from the remote compute device; detect the trigger pattern in the additional data; trigger a timestamp corresponding to detection of the trigger pattern in the additional data; and remove one or more alignment markers in the additional data after detection of the trigger pattern in the additional data.

Example 23 includes a compute device for timestamping data packets, the compute device comprising circuitry for receiving, by the network interface controller, data from another component of the compute device; means for inserting, by the network interface controller, one or more alignment markers in the data; means for detecting, by the network interface controller, a trigger pattern in the data after insertion of the one or more alignment markers; means for triggering, by the network interface controller, a timestamp corresponding to detection of the trigger pattern; and circuitry for sending, by the network interface controller, the data to a remote compute device.

Example 24 includes the subject matter of Example 23, and further including means for removing, by the network interface controller, the one or more alignment markers from the data; means for remapping, by the network interface controller, the one or more alignment markers; means for encoding, by the network interface controller, the data with a forward error correction algorithm; and means for inserting, by the network interface controller, the one or more alignment markers as codeword markers in the data.

Example 25 includes the subject matter of any of Examples 23 and 24, and further including means for receiving, by the network interface controller, additional data from the remote compute device; means for detecting, by the network interface controller, the trigger pattern in the additional data; means for triggering, by the network interface controller, a timestamp corresponding to detection of the trigger pattern in the additional data; and means for removing, by the network interface controller, one or more alignment markers in the additional data after detection of the trigger pattern in the additional data.

The invention claimed is:
1. A compute device for timestamping data packets, the compute device comprising:
   a processor;
   a memory; and
   a network interface controller to:
      receive data from another component of the compute device;
      insert one or more alignment markers in the data;
      detect a trigger pattern in the data after insertion of the one or more alignment markers;
      trigger a timestamp responsive to detection of the trigger pattern;
      send the data to a remote compute device;

receive additional data from the remote compute device;
detect the trigger pattern in the additional data;
trigger a timestamp responsive to detection of the trigger pattern in the additional data; and
remove one or more alignment markers in the additional data after detection of the trigger pattern in the additional data.

2. The compute device of claim 1, wherein the network interface controller is further to:
remove the one or more alignment markers from the data;
remap the one or more alignment markers;
encode the data with a forward error correction algorithm; and
insert the one or more alignment markers in the data as codeword markers in the data.

3. The compute device of claim 1, wherein the trigger pattern is a start of frame delimiter.

4. The compute device of claim 1, the data including a plurality of 64-bit blocks, wherein the network interface controller is further to:
add synchronization headers to each of the plurality of 64-bit blocks; and
scramble each of the plurality of 64-bit blocks,
wherein to detect the trigger pattern in the data includes to detect the trigger pattern in the plurality of 64-bit blocks after addition of the synchronization headers and before scrambling of the plurality of 64-bit blocks.

5. The compute device of claim 1, comprising the data including a plurality of 64-bit blocks, wherein the network interface controller is further to scramble each of the plurality of 64-bit blocks after insertion of the alignment markers without scrambling the alignment markers.

6. The compute device of claim 1, wherein the network interface controller is further to remove a portion of an interpacket gap from the data to compensate for the insertion of the alignment markers.

7. The compute device of claim 1, wherein to send the data to the remote compute device comprises to send the data to the remote compute device at a rate of at least 25 gigabits per second.

8. A method for timestamping data packets by a network interface controller of a compute device, the method comprising:
receiving data from another component of the compute device;
inserting one or more alignment markers in the data;
detecting, by the network interface controller, a trigger pattern in the data after insertion of the one or more alignment markers;
triggering a timestamp corresponding responsive to detection of the trigger pattern;
sending the data to a remote compute device
receiving additional data from the remote compute device;
detecting the trigger pattern in the additional data;
triggering a timestamp responsive to detection of the trigger pattern in the additional data; and
removing one or more alignment markers in the additional data after detection of the trigger pattern in the additional data.

9. The method of claim 8, further comprising:
removing the one or more alignment markers from the data;
remapping the one or more alignment markers;
encoding the data with a forward error correction algorithm; and
inserting the one or more alignment markers in the data as codeword markers in the data.

10. The method of claim 8, wherein the trigger pattern is a start of frame delimiter.

11. The method of claim 8, the data including a plurality of 64-bit blocks, the method further comprising:
adding synchronization headers to each of the plurality of 64-bit blocks; and
scrambling each of the plurality of 64-bit blocks,
wherein detecting the trigger pattern in the data includes detecting the trigger pattern in the plurality of 64-bit blocks after addition of the synchronization headers and before scrambling of the plurality of 64-bit blocks.

12. The method of claim 8, the data including a plurality of 64-bit blocks, the method further comprising scrambling each of the plurality of 64-bit blocks after insertion of the alignment markers without scrambling the alignment markers.

13. The method of claim 8, further comprising removing a portion of an interpacket gap from the data to compensate for the insertion of the alignment markers.

14. One or more non-transitory machine-readable media comprising a plurality of instructions stored thereon that, when executed, causes a compute device to:
receive data from another component of the compute device;
insert one or more alignment markers in the data;
detect a trigger pattern in the data after insertion of the one or more alignment markers;
trigger a timestamp responsive to detection of the trigger pattern; and
send the data to a remote compute device;
receive additional data from the remote compute device;
detect the trigger pattern in the additional data;
trigger a timestamp responsive to detection of the trigger pattern in the additional data; and
remove one or more alignment markers in the additional data after detection of the trigger pattern in the additional data.

15. The one or more non-transitory computer-readable media of claim 14, wherein the plurality of instructions further causes the compute device to:
remove the one or more alignment markers from the data;
remap the one or more alignment markers;
encode the data with a forward error correction algorithm; and
insert the one or more alignment markers in the data as codeword markers in the data.

16. The one or more non-transitory computer-readable media of claim 14, wherein the trigger pattern is a start of frame delimiter.

17. The one or more non-transitory computer-readable media of claim 14, the data including a plurality of 64-bit blocks, wherein the plurality of instructions further causes the compute device to:
add synchronization headers to each of the plurality of 64-bit blocks; and
scramble each of the plurality of 64-bit blocks,
wherein to detect the trigger pattern in the data includes to detect the trigger pattern in the plurality of 64-bit blocks after addition of the synchronization headers and before scrambling of the plurality of 64-bit blocks.

18. The one or more non-transitory computer-readable media of claim 14, comprising the data including a plurality of 64-bit blocks, wherein the plurality of instructions further causes the compute device to scramble each of the plurality of 64-bit blocks after insertion of the alignment markers without scrambling the alignment markers.

19. The one or more non-transitory computer-readable media of claim 14, wherein the plurality of instructions further causes the compute device to remove a portion of an interpacket gap from the data to compensate for the insertion of the alignment markers.

* * * * *